Figure 1:
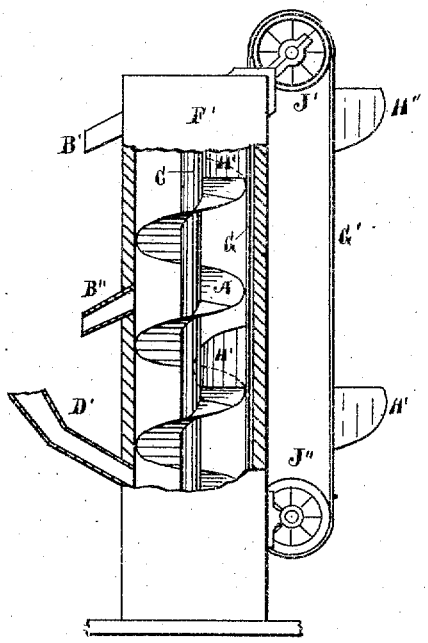

H. W. CALDWELL.

GRAIN-CONVEYER.

No. 6,838. Reissued Jan. 4. 1876.

WITNESSES;

Chas. E. Marsh.

E. D. Smith

INVENTOR.

Henry W. Caldwell.

UNITED STATES PATENT OFFICE.

HENRY W. CALDWELL, OF INDIANAPOLIS, INDIANA.

IMPROVEMENT IN GRAIN-CONVEYERS.

Specification forming part of Letters Patent No. 164,715, dated June 22, 1875; reissue No. 6,838, dated January 4, 1876; application filed December 17, 1875.

*To all whom it may concern:*

Be it known that I, HENRY W. CALDWELL, of Indianapolis, county of Marion, State of Indiana, have invented an Improvement in Conveyers and Elevators, of which the following are specifications, reference being had to the accompanying drawings.

The object of my invention is the construction of an improved conveyer and elevator for grain and other material, made from wrought-iron pipe, with wrought-iron flights, forming a continuous screw on the pipe which is used as a revolving shaft. The practical difficulties attending the construction of an iron shaft with a wrought-iron flight have, previous to my invention, been found insurmountable, and have prevented its use, while theoretically the superiority of a conveyer or elevator with shaft and flight of wrought-iron which could be made light enough and stiff enough to be used without sagging or quivering, or the flights becoming bent or torn from the shaft, has been obvious. The difficulties have been these, namely: In following the old method of fastening the spiral flights to the shaft in sections it has been found impossible so to attach wrought-iron flights to an iron shaft as to be secure. They could be made passably secure on a solid iron shaft by riveting entirely through the shaft; but a conveyer so made, in order not to sag or run with a trembling motion, would require a shaft of excessive weight and excessive power to run it. On a hollow iron shaft, under any of the methods of constructing conveyers known previous to my invention, a wrought-iron flight could not be securely fastened at all. A great obstacle has also been in so fashioning and conforming a wrought-iron spiral flight as to perfectly fit a round shaft, and at the same time get rid, at the outer edge of the spiral, of the fullness in the metal resulting from bending and twisting the wrought-iron plate from which the spiral is cut into the screw or spiral form. This shape can easily be made in cast-iron, there being no peculiar mechanical difficulty in constructing the necessary wooden pattern and forming the molds in which to run the metal. The difficulty in successfully adapting a wrought-iron spiral flight to a wrought-iron shaft is more than a mere mechanical one, and requires invention and discovery of means and methods heretofore unknown. The result has, therefore, always been the continued use of the old wooden shaft with wooden or iron flights attached in sections, or, in later instances, of cast-iron flights cast or affixed to a cast-iron hub encircling a wrought-iron shaft. By my invention the wrought-iron hollow shaft, with its manifold advantages all saved, becomes for the first time practicable in the construction of conveyers, also of elevators. I adapt to it, in a peculiar manner, at any required pitch, a continuous spiral wrought iron flight, so constructed that the ordinary strain upon it in conveying grain or other material will cause it to hug the shaft and become more tightly affixed to the shaft as the strain from that cause or any other becomes harder. By attaching the sections of the flights together and making it continuous, and by giving it the peculiar form resulting from the mathematical rule for cutting it out, as hereinafter described, I am enabled to make the flights in a measure thus self-fastening to the shaft, so that it becomes a matter of comparative ease to make it entirely secure by any additional methods, and enables me successfully to do away with the fullness in the outer edge of the spiral resulting from stretching it on its inner edge, or, more properly, making its inner edge to fit a smaller cylinder than the circle to which it is cut by stretching the plate into a spiral form, as in Fig. 4. It is by thus constructing a continuous wrought-iron flight that I am enabled to adapt the hollow wrought-iron shaft to the purpose of a shaft for conveyers and elevators. By the same means wrought-iron flights, for the first time, attached to the shafts of conveyers and elevators become practicable. Together, my wrought-iron flight and hollow wrought-iron shaft combined form a conveyer with every known desirable quality.

The tendency of the spiral flight to clasp the shaft tighter when a strain is exerted on the flights is by no means sufficient in itself to hold it to its proper place, for such strain, when in use, and the force required to hold the flight to its proper place, are very considerable. This tendency reduces the heretofore impracticable task of fastening the flights to a hollow wrought-iron shaft by additional means to a matter of feasibility.

Any ordinary method of attaching the flights to the shaft—such as would suggest itself to the mind of an ordinary mechanic—will make the flight secure if constructed continuously according to my invention. By the term "continuous" I do not mean that the wrought-iron plates composing the flights must necessarily be all fastened together from one end of the shaft to the other. The conveyer may be made up of sections of continuous flights attached to the shaft. Each section I deem "continuous" if its inner arc measures more than the circumference of the shaft; or, in other words, if the inner edge of the plate of a single section, where it bears upon the shaft, be measured by laying a tape-line along such inner edge, and the inner edge be thus found to measure more than the circumference of the shaft, then such section of the flight, whether composed of two or more pieces riveted together, or of one plate, is to be deemed continuous.

I make continuous sections from a single plate or sheet of iron; but by the term "continuous" I do not mean, either, that each section must be made necessarily of one plate, for it may be made of fractions of plates patched together.

Heretofore the sections of flights employed upon shafts of any material have not usually reached more than one-fourth of the way around the shaft, except in cases where the flights have been made of cast-iron or cast on iron hubs.

Figure 5:
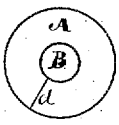

The following directions for cutting out my flights may be observed:

The given numbers from which to calculate the dimensions of the hole B, Fig. 5, to be cut in the plate A are, first, the number of inches of pitch desired in the spiral, and, second, the number of inches of the diameter of the shaft.

Figure 4:
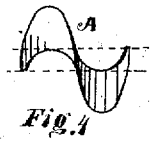

It is obvious that the hole must be cut larger than the shaft, so that when the hole is decreased by the plate being drawn to a spiral shape of the required pitch, as at Fig. 4, the hole will then closely fit the shaft. The following is the rule: First multiply the diameter of the shaft by 3.1416, and thus obtain the circumference of the shaft; square this circumference; square the pitch; add the products together. The square root of this product will give the helix. Divide this last product by 3.1416, and the product gives the diameter of the hole to be cut that will fit the shaft when the plate is stretched to the given pitch. The flight will then stand at right angles to the shaft after being properly stretched.

Among the many advantages of the hollow wrought-iron shaft thus (by means of my invention) adapted to the purposes of a conveyer are its superior lightness, stiffness, strength, its exemption from liability to sag, or warp, or run with a tremulous or eccentric motion, and the high rate of speed to which it may be run. It requires much less power to run it than the solid wooden or iron shaft. It is made stronger and stiffer by reason of being encircled by my continuous wrought-iron flight. The circumference of the entire conveyer may be made less than the old ones, and at the same time the conveyer-box be not filled up, as in case of a wooden shaft, with the mere bulk of the shaft; and while the size of the conveyer may be diminished below that of the old conveyer, its capacity to carry grain and other material may be greatly increased.

Figure 6:
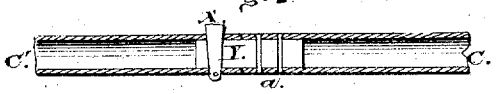
Figure 2:
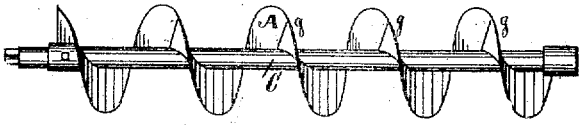
Figure 3:
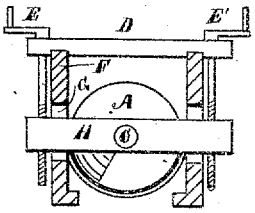

The following is a description of the drawings:

Figure 1 represents my improved conveyer-screw, set perpendicular to form an elevator, and also represents the followers attached to the endless chain or belt. Fig. 2 represents a section of the conveyer-screw formed of a continuous wrought-iron spiral flight attached to a hollow wrought-iron pipe. Fig. 3 is a sectional or end view of the conveyer-box, showing the arrangement of the adjustable bearings. Fig. 4 is a view of the flight as cut by the pattern in Fig. 5, and stretched out to the given pitch, so as to fit the shaft. Fig. 6 is a sectional view of the hollow shaft, and shows its manner of coupling.

A represents the flights, which are cut as shown in Fig. 5, and then stretched, as shown in Fig. 4, to the desired pitch. The hole B of the wrought-iron flight will then fit snugly all around the hollow wrought-iron shaft, and, when each section A of the wrought-iron flights are united together, as at *g*, Fig. 2, and attached to the shaft by any of the methods hereinbefore described, the improved conveyer-screw is constructed as represented in Fig. 2.

When used as a conveyer, the screw, as shown in Fig. 2, is placed in the conveyer-box, an end view of which is represented in Fig. 3, and is supported in hangers, which should be adjustable, similar to the manner described in Fig. 3, which consists of a journal-bearing, H, that may extend across the box, and project at each end far enough to receive the adjusting-screws E E′, which operate in holes in each end of the top bar D, and also in nuts formed in each end of the journal-bar H, all arranged so as to adjust the conveyer-screw, and prevent friction with the curved metallic bottom of the conveyer-box F.

Each section of the conveyer-screw, as shown in Fig. 2, may be coupled together in any ordinary manner, so as to extend the conveyer to any desired length, the bearings or journals that operate in the hangers being at the couplings.

In Fig. 1 I have represented my improved conveyer in a perpendicular position, working in a closed box lined with iron, for the purpose of elevating grain or other material. The pulleys J′ J″ at the top and bottom of the elevator are for the endless chain or belt G′ to work over. On this chain or belt are securely fastened the followers H′ H′, which enter the elevator-box at the bottom, and as the conveyer-screw C A revolves these followers are carried up between the flights, and all grain that is admitted to the elevator through the spout D′ is elevated to the top, or tapped at any desired place, as at B′ B″. There are several followers, H′ H″, secured to the chain or belt G′, so that there are several of them always in the elevator at once.

What I claim as new, and wish to secure by Letters Patent, is—

1. The hollow wrought-iron shaft, adapted to the purposes of a conveyer, in the manner and for the uses and objects specified.

2. The hollow wrought-iron shaft, adapted to the purposes of an elevator, in the manner as and for the uses and objects specified.

3. The continuous wrought-iron spiral flight, constructed in the manner and form specified, and adapted to any cylindrical shaft used for the purposes of a conveyer, substantially as set forth and described.

4. The continuous wrought-iron flight A, constructed and applied to the hollow shaft C, substantially as described and set forth.

5. The conveyer-screw, arranged in an upright position in a tight box, in combination with the followers H′ H′, operated substantially as specified.

6. As an article of manufacture, the conveyer, Fig. 2, composed of a hollow wrought-iron shaft, a continuous spiral flight fitting the shaft and attached thereto, as and for the purposes specified.

In testimony whereof I have signed my name to this specification in the presence of two subscribing witnesses.

HENRY W. CALDWELL.

Witnesses:
E. O. FRINCK,
CHAS. E. MARSH.